April 1, 1924.
J. H. RAMSEY
SILENT CHAIN
Filed Dec. 8, 1920
1,488,710
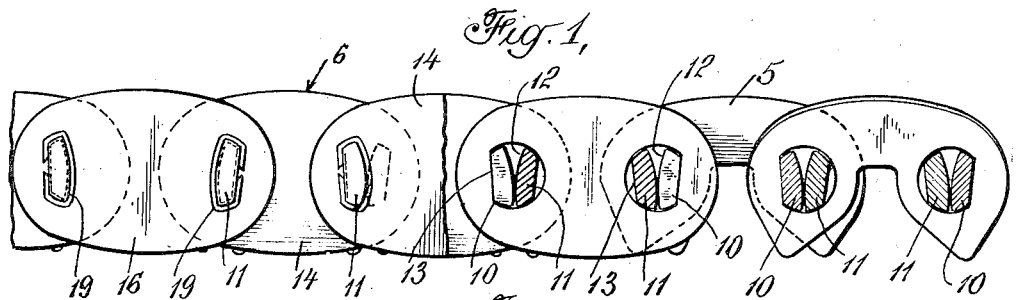
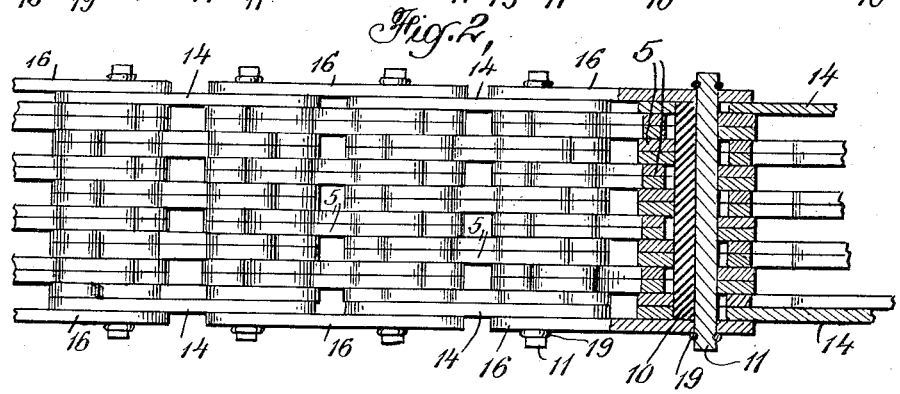
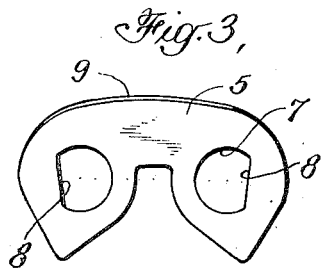
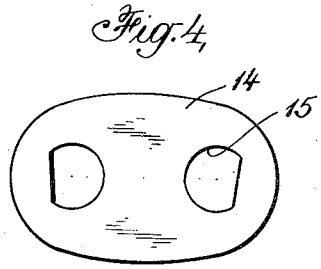
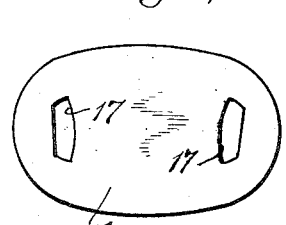
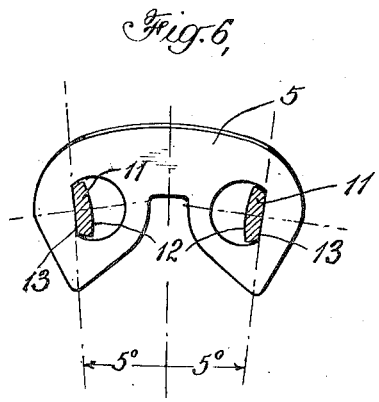
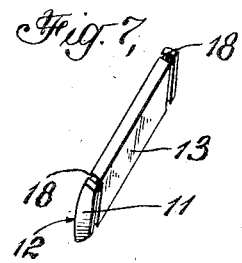
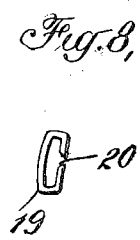
Joseph H. Ramsey  Inventor
By his Attorneys Patented Apr. 1, 1924.

1,488,710

UNITED STATES PATENT OFFICE.

JOSEPH H. RAMSEY, OF ALBANY, NEW YORK, ASSIGNOR, BY MESNE ASSIGNMENTS, TO RAMSEY CHAIN CO., INC., OF ALBANY, NEW YORK, A CORPORATION OF NEW YORK.

SILENT CHAIN.

Application filed December 8, 1920. Serial No. 429,103.

*To all whom it may concern:*

Be it known that I, JOSEPH H. RAMSEY, a citizen of the United States, residing at Albany, in the county of Albany, State of New York, have invented certain new and useful Improvements in Silent Chains; and I do hereby declare the following to be a full, clear, and exact description of the invention, such as will enable others skilled in the art to which it appertains to make and use the same.

This invention relates to power transmission chain generally referred to as "silent chain" and more particularly to the so-called "rocker joint" type, wherein the connecting elements or pintles joining the successive links comprise two parts which mutually cooperate to provide for articulation of the chain.

Chains of the type referred to have been developed in different specific embodiments heretofore, but all have been subject to certain disadvantages, particularly in the complication of structure which entails additional costs in manufacturing and assembling the chain. Further disadvantages are the initial stretch to which the chain is subject when first used, excessive wear of the parts and the necessary presence of considerable back-lash in the joints, resulting from excessive clearance between the parts of the pintle and the links. These and other inherent defects in the silent chain have been exhaustively studied, and the present invention is the result of an effort to eliminate or to reduce to a minimum the defects mentioned.

It is the primary object, therefore, of the invention to provide a silent chain of simple construction, permitting maximum possible dimensions of all surfaces which are subject to wear; thus insuring extended life and increased efficiency of the chain.

Another object of the invention is the provision of a chain wherein the pintle apertures are simple in form and symmetrically arranged, permitting extreme accuracy in manufacture and the employment of comparatively inexpensive special tools therein; thus reducing the variations in form and location of the apertures which are ordinarily taken up in the "wearing in" period and are the cause of the stretch usually met in chains of this type.

A further object of the invention is to so form the pintles and the apertures as to insure true rocking movement of the pintle parts, preferably to an equal angle on both sides of the line joining the centers of the apertures, and to minimize the clearance between the pintles and the apertures; thus practically eliminating back-lash and wear of the parts.

Further objects and advantages of the invention are the provision of a simple device for holding the pintles in assembled relation with the links and in the general improvement of the structure and wearing qualities of rocker joints in silent chains, as will be better understood by reference to the following specification and accompanying drawing, in which—

Fig. 1 is an elevation, partly in section, of a chain conforming to the invention.

Fig. 2 is a plan view thereof, partially in section.

Fig. 3 is an elevation of one of the links.

Fig. 4 is an elevation of one of the inner cover plates.

Fig. 5 is an elevation of one of the outer cover plates.

Fig. 6 is a detail in section, illustrating the preferred angular relation between the pintles.

Fig. 7 is a view in perspective of one of the pintle parts, and

Fig. 8 is an elevation of the locking device for the pintles.

In devising a link for the silent chain, it has been assumed that the general outline of the link will follow closely the form of link commonly in use, which is shaped to conform with standard sprocket teeth, and that the simplest form of aperture will be a circle. It has been assumed that the link should be symmetrical, with both apertures identical in shape. Starting with such a link, if we lay out a two part pintle, each part having a convex surface of suitable radius, preferably substantially equal to ⅜ the pitch of the chain, while the remaining surface of both parts of the pintle conforms to the outline of a circle, we find that to permit the extreme rocking movement, the circular aperture must be considerably larger in diameter than the outside diameter of the two parts of the pintle, or, in other words, maximum clearance must be provided to permit the desired articulation of the chain. This amount of clearance is undersirable, since it would permit relative movement of the pintle parts and the links, and introduces a considerable element of wear, thus permitting continuous stretching of the chain in use.

In order that there may be a true rolling contact between the pintle parts, it is desirable that each of the two parts of the pintle remain stationary with respect to the links with which it is in contact. Accordingly, if we remove a portion of the rear face of each pintle part forming flattened surfaces, and correspondingly flatten one side of each of the apertures at opposite ends of the overlapping links to conform to these flattened surfaces, each pintle part will rest with its flattened face against the flattened edges of the apertures in the links which it engages, we find then, that within the range of articulation of the chain, the pintle parts, with the provision of relatively slight amount of clearance, will move entirely within the apertures in the adjacent links which are not engaged by the respective parts, without binding and comparatively little slipping or rubbing of one pintle part on the other when the pintles are rocked. Thus, we are enabled to produce an extremely simple chain, every link of which is symmetrical, with apertures which are fundamentally circles, while the two parts of the pintle are also symmetrical and exactly alike except as to length.

In order that such wear as occurs in the chain may be uniformly distributed, it is preferred that the angular movement of the pintle parts with respect to each other should be equal on opposite sides of the center lines of the rocking surfaces. In the usual practice, a chain is designed for 30° of articulation between adjacent links to permit the chain to travel around the sprocket, and for 10° of articulation in the opposite direction to provide for angular displacement of the links, caused by the sag of the chain between the sprockets. The total angle of articulation is, therefore, 40°. A chain such as is herein described, might be employed with relatively large sprockets if the line of contact between the pintle parts was in the center lines of the rocking surfaces; but the degree of movement between the pintle parts would not be uniform on opposite sides of the line of centers, the angles of the arcs traveled during rocking movement being 30° below this line and 10° above. In order that the angular movement between the pintle parts on opposite sides of the center lines of the rocking surfaces may be uniform, it is preferred to tilt the cooperating pintle parts relatively to each other preferably at an angle of 10°, so that the line of contact between the pintle parts, when the chain is straight, is below the center line of the rocking surfaces. This arrangement permits the full angular displacement of the links relatively to each other, i. e., 30°, permitting the chain to travel about the smallest sprockets, while, at the same time, insuring the minimum aperture possible with the least clearance between the apertures and the pintle parts. The result is a chain of maximum strength, in which the stretch during the wearing in period is reduced to a minimum. The chain is extremely simple in form, all of the links being identical, and the outer cover plates being the only parts which require apertures of different shape. The two parts of the pintle may be identical in form and cut from a rod drawn to the desired shape, thus obviating the necessity of drawing special and complicated shapes for each of the two parts of the pintle as has been necessary in many of the structures heretofore suggested.

With this general statement of the chief purpose and objects of the invention and the means preferably employed in carrying it into effect, the following more detailed description will be understood:

Referring to the drawing, 5 indicates a link of the chain 6, which, as indicated in Fig. 3, has the accepted external outline and is provided with two apertures 7, which are generally circular in form except for the flattened edges 8. The upper edges of the links are preferably bevelled at 9 for convenience in separating the links by the insertion of a tool therebetween in the process of assembling them in constructing a chain. The links are preferably assembled in pairs overlapping alternately with the apertures at the ends of a group of links registering with the corresponding apertures at the opposite ends of another group of links. The pintle parts 10 and 11 are then inserted to provide the desired articulation. The pintle part 10 is somewhat shorter than the pintle part 11. Both parts have convex surfaces 12 adapted for rolling contact, the radii of the two surfaces being preferably identical and substantially equal to ⅜ of the chain pitch. Each of the pintle parts has also flattened faces 13, adapted to cooperate with the corresponding flattened edges of the apertures in the particular set of links against which the pintle part rests. The two edges of each of the pintle parts are preferably provided with curved surfaces, the radii of which are the same as those of the apertures, the pintles being of sufficient thickness to provide a slight clearance. The clearance required is, however, usually very slight, being preferably only sufficient to insure against rubbing contact between the pintle parts and the edge of the aperture. The pintle parts being of the same thickness at both edges, as shown in the drawing, the flattened edges of the apertures in the links are so disposed as to give the pintle parts a relative tilt of preferably about 10° to each other when the chain is straight, if the chain is to be used with other than very large structures.

In completing the chain, inner cover plates 14 are provided with apertures 15, corresponding to those in the links and are assembled with the chain between the ends of adjoining links; and outer cover plates 16, having apertures 17 shaped to receive the ends of only one of each pair of pintle parts, are assembled over the ends of each group of links. As previously noted, one of each pair of pintle parts is short and these pintles are held in position by the cover plates 16, while the other of each pair of pintle parts extends through the corresponding aperture therein. The latter pintle parts are preferably provided at their ends with grooves 18 and are held in place by wire clips 19 which snap into the grooves, and thus prevent withdrawal thereof when the chain has been completely assembled. These wire clips 19 closely fit the grooves and provide a neat and secure lock for the cover plates. In order that they may be removed when necessary in repairing the chain or replacing links, the wire clips are preferably provided with under-cut ends 20 as indicated in Fig. 8 so that a sharp tool may be inserted between the end of the clip.

From the foregoing, it will be understood that the chain as illustrated and described herein, presents numerous advantages over chains as heretofore known and used. For example, in the manufacture of such articles, it is customary to stamp the apertures in a blank and to thereafter use the apertures to center the blanks in a suitable press which cuts the blanks to the desired outline of the links. Obviously, the simplicity of the form of the apertures greatly facilitates this operation, and, moreover, the die employed may be of simple form and is, consequently, less liable to distortion than a die of the complicated shape usually required in manufacturing the links of silent chains. The advantage of a two part pintle of symmetrical and simple form is manifest when it is understood that the complicated pintles heretofore in use have been constructed by drawing metal through dies of the desired shape. When the pintle parts have necessarily small projections and other complicated features, the drawing is extremely difficult and the product is not uniform; whereas a simple rod of the shape of the pintle parts described herein may be readily drawn and cut to the desired size. The absence of any considerable clearance between the pintle parts and the links materially reduces slipping of the pintle parts one upon the other, and the consequent wear so that the life of the chain is prolonged. Whatever wear occurs in a chain such as is described herein, is extremely slight, so that its effect is not noticeable for a considerable period. Actual tests of chain, constructed in accordance with the invention, in comparison with other standard forms of chain of this general type, have shown that the stretch in the present chain has been reduced very considerably particularly in the early or "wearing in" period.

Obviously, various changes may be made in the form and arrangement of the parts within the spirit and scope of the accompanying claims without departing from the invention or sacrificing any of its material advantages.

I claim:

1. In a silent chain, the combination including a plurality of overlapping sets of symmetrical links shaped to engage sprocket teeth and each having apertures which are substantially circular in form except for flattened edges at opposite ends of the links, and articulating pintles disposed in the apertures of the overlapping links, each pintle comprising two parts having flat sides to engage the flattened edges of the apertures and opposed convex cooperating surfaces adapted for rolling contact.

2. In a silent chain, the combination including a plurality of overlapping sets of symmetrical links, each having apertures which are substantially circular in form except for flattened edges at opposite ends of the links, and articulating pintles disposed in the apertures of the overlapping links, each pintle comprising two parts having flat sides to engage the flattened edges of the apertures and opposed convex cooperating surfaces having radii corresponding to approximately $\frac{2}{3}$ of the pitch of the chain and adapted for rolling contact.

3. In a silent chain, the combination including a plurality of overlapping sets of symmetrical links shaped to engage sprocket teeth and each having apertures which are substantially circular in form except for flattened edges disposed in chords of the circles at opposite ends of the links and articulating pintles disposed in the apertures of the overlapping links, each pintle comprising two parts having flat sides to engage the flattened edges of the apertures and opposed convex cooperating surfaces adapted for rolling contact.

4. In a silent chain, the combination including a plurality of overlapping sets of symmetrical links shaped to engage sprocket teeth and each having apertures which are substantially circular in form except for flattened edges at opposite ends of the links, and bearing an angular relation to each other, and articulating pintles disposed in the apertures of the overlapping links, each pintle comprising two parts having flat sides to engage the flattened edges of the apertures and opposed convex cooperating surfaces adapted for rolling contact.

5. In a silent chain, the combination including a plurality of overlapping sets of symmetrical links, each having apertures which are substantially circular in form except for flattened edges at opposite ends of the links and articulating pintles disposed in the apertures of the overlapping links, each pintle comprising two parts having flat sides to engage the flattened edges of the apertures and opposed convex cooperating surfaces adapted for rolling contact, the flattened edges of the apertures being angularly disposed so that the line of contact of the convex surfaces of the pintle parts travels substantially equal distances on opposite sides of the centre line of the convex surfaces during the maximum flexure of the chain in both directions.

6. In a silent chain, the combination including a plurality of sets of links, each having apertures provided with flattened edges at opposite ends of the links, and articulating pintles disposed in the apertures of the overlapping links, each pintle comprising two parts having flat sides to engage the flattened edges of the apertures, and opposed convex cooperating surfaces, the apertures providing sufficient clearance to permit free rolling contact of the cooperating surfaces.

7. In a silent chain, the combination including a plurality of sets of links, each having apertures provided with flattened edges at opposite ends of the links, and articulating pintles disposed in the apertures of the overlapping links, each pintle comprising two parts having flat sides to engage the flattened edges of the apertures, and opposed convex cooperating surfaces having radii corresponding to approximately $\frac{3}{5}$ of the pitch of the chain and the apertures providing sufficient clearance to permit free rolling contact of the cooperating surfaces.

8. In a silent chain, the combination including a plurality of sets of links shaped to engage sprocket teeth and each having apertures provided with flattened edges at opposite ends of the links and bearing an angular relation to each other, and articulating pintles disposed in the apertures of the overlapping links, each pintle comprising two parts having flat sides to engage the flattened edges of the apertures, and opposed convex cooperating surfaces, the apertures providing sufficient clearance to permit free rolling contact of the cooperating surfaces.

9. In a silent chain, the combination including a plurality of sets of links, each having apertures provided with flattened edges at opposite ends of the links, and articulating pintles disposed in the apertures of the overlapping links, each pintle comprising two parts having flat sides to engage the flattened edges of the apertures, and opposed convex cooperating surfaces, the apertures providing sufficient clearance to permit free rolling contact of the cooperating surfaces, the flattened edges of the apertures being disposed so that the line of contact of the convex surfaces of the pintle parts travels substantially equal distances on opposite sides of the centre lines of the convex surfaces during the maximum flexure of the chain in both directions.

10. In a silent chain, the combination including a plurality of overlapping sets of links shaped to engage sprocket teeth and each having apertures at opposite ends of the links, and articulating pintles disposed in the apertures of the overlapping links, each pintle comprising two parts having faces adapted to engage the edges of the apertures and opposed convex cooperating surfaces, the apertures providing sufficient clearance to permit free rolling contact of the cooperating surfaces.

11. In a silent chain, the combination including a plurality of overlapping sets of links, shaped to engage sprocket teeth and each having apertures at opposite ends of the links, and articulating pintles disposed in the apertures of the overlapping links, each pintle comprising two parts having faces adapted to engage the edges of the apertures, and opposed convex cooperating surfaces having radii corresponding to approximately three-fifths of the pitch of the chain and the apertures providing sufficient clearance to permit free rolling contact of the cooperating surfaces.

12. In a silent chain, the combination including a plurality of overlapping sets of links shaped to engage sprocket teeth and each having apertures at opposite ends of the links, and articulating pintles disposed in the apertures of the overlapping links, each pintle comprising two parts having faces adapted to engage the edges of the apertures and opposed convex cooperating surfaces, the apertures providing sufficient clearance to permit free rolling contact of the cooperating surfaces, the line of contact of the convex surfaces being below the center lines thereof when the chain is straight.

13. In a silent chain, the combination including a plurality of sets of overlapping links shaped to engage sprocket teeth and having apertures therein, and pintles extending through the apertures to engage the links, each pintle consisting of two cooperating parts provided with convex engaging faces relatively disposed so that the line of contact thereof travels substantially equal distances on opposite sides of the center lines of the faces during maximum flexure of the chain in both directions, the apertures providing sufficient clearance to permit free rolling contact of the cooperating surfaces.

14. In a silent chain, the combination including a plurality of overlapping sets of links shaped to engage sprocket teeth and having transversely aligned apertures at opposite ends, and articulating pintles extending transversely through said apertures, each pintle comprising two parts having outer faces adapted to engage appropriate edge portions of the respective apertures, and having opposed convex cooperating surfaces adapted for free rolling contact, the pintle parts being tilted relatively to each other to bring the line of contact of their convex surfaces below the center lines thereof when the chain is straight, and the apertures in the links affording sufficient clearance to permit the aforesaid free rolling contact of the pintle parts.

15. A silent chain consisting of a plurality of overlapping sets of links shaped to engage sprocket teeth and having transversely aligned apertures and two-part pintles having cooperating convex surfaces in contact below the approximate pivotal center when the chain is straight, the apertures providing sufficient clearance to permit free rolling contact of one pintle part upon the other.

16. In a silent chain a plurality of overlapping sets of links shaped to engage sprocket teeth and having openings therein to receive articulating pintles and two-part pintles extending through the openings in the links, the parts having convex cooperating bearing faces with the chords of said faces angularly disposed so that the line of engagement between the pintle parts is below the approximate pintle center when the chain is straight, the openings providing sufficient clearance to permit free rolling contact between the convex cooperating surfaces of the pintle parts.

In testimony whereof I affix my signature.

JOSEPH H. RAMSEY.